United States Patent [19]

Shimizu et al.

[11] Patent Number: 5,442,002
[45] Date of Patent: Aug. 15, 1995

[54] POLYMER SCALE DEPOSITION PREVENTIVE AGENT

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 278,224

[22] Filed: Jul. 21, 1994

[30] Foreign Application Priority Data

Jul. 22, 1993 [JP] Japan .................. 5-201842

[51] Int. Cl.⁶ .......................... C08K 5/29; C08G 12/00
[52] U.S. Cl. ................................. 524/81; 524/4; 526/62; 526/74; 526/918; 528/229; 528/492
[58] Field of Search .............. 526/62, 74, 918; 528/229, 492; 524/81

[56] References Cited

U.S. PATENT DOCUMENTS

| | | | |
|---|---|---|---|
| 4,758,639 | 7/1988 | Koyanagi | 526/62 |
| 4,831,107 | 5/1989 | Erhan | 528/229 |
| 4,882,413 | 11/1989 | Erhan | 528/229 |
| 4,981,946 | 1/1991 | Erhan | 528/229 |

FOREIGN PATENT DOCUMENTS

| | | |
|---|---|---|
| 106293 | 4/1984 | European Pat. Off. . |
| 0165338 | 12/1985 | European Pat. Off. . |
| 0317306 | 5/1989 | European Pat. Off. . |
| 372967 | 6/1990 | European Pat. Off. . |
| 540934A1 | 5/1993 | European Pat. Off. . |
| 606013A1 | 7/1994 | European Pat. Off. . |

OTHER PUBLICATIONS

Dr. Alexander von Funer, European Search Report 94111504.0–; Nov. 11, 1994.

*Primary Examiner*—Fred Zitomer
*Attorney, Agent, or Firm*—Sughrue, Mion, Zinn, Macpeak & Seas

[57] ABSTRACT

A polymer scale deposition preventive agent for use in polymerization of a monomer having an ethylenically unsaturated double bond, comprising an alkaline solution containing a condensation product of (A) a diphenyl compound having at least two amino groups and (B) a quinone compound. When the aforementioned monomer is polymerized in a polymerization vessel having a coating formed by applying the aforementioned preventive agent to inner wall surfaces followed by drying, polymer scale can be effectively prevented from being deposited not only on the areas located in the liquid-phase region but also on the areas around the interface between the gas and liquid phases in the polymerization vessel. When an obtained polymer is formed into a sheet or the like, it is possible to obtain a formed product having few fish eyes and good initial coloration.

9 Claims, No Drawings

POLYMER SCALE DEPOSITION PREVENTIVE AGENT

BACKGROUND OF THE INVENTION

1. Field of the Invention

The present invention relates to a polymer scale deposition preventive agent for use in polymerization of a monomer having an ethylenically unsaturated double bond, and a process for producing a polymer using the same.

2. Description of the Prior Art

Heretofore, as methods for polymerization of a monomer having an ethylenically unsaturated double bond have been known suspension, emulsion, solution, gas phase and bulk polymerization processes and the like. In any of these polymerization processes, polymer scale is liable to be deposited on the areas with which the monomer comes into contact, such as inner walls, stirring equipment and so on of a polymerization vessel.

The deposition of the polymer scale results in disadvantages that the yield of the polymer, cooling capacity of the polymerization vessel and so on are lowered, and that the polymer scale may peel off and mix into a polymeric product, thereby consequently impairing the quality of products obtained by forming such a polymeric product. In addition, removal of deposited polymer scale is necessarily very laborious and time-consuming. Further, the polymer scale contains unreacted monomers, so that there is a risk of physical disorders in the human body due to monomers, as having been a very serious problem in recent years.

In the prior art, for preventing such polymer scale deposition on the polymerization vessel inner wall and so forth, for example, as locally practiced in suspension polymerization of vinyl chloride, there have been known a method in which a polymer scale deposition preventive agent comprising a polar organic compound such as amine compounds, quinone compounds, aldehyde compounds and so on is applied to the polymerization vessel inner wall to form a coating, and a method in which such compounds are added to an aqueous medium for performing suspension polymerization (Japanese Patent Publication (KOKOKU) No. 45-30343).

However, these methods have the disadvantage that, although the polymer scale deposition preventive effect is exhibited while polymerization is repeated for up to about 5 or 6 batches, the preventive effect diminishes if the number of repeated batches of polymerization exceeds the above (that is, the durability is poor). This point exerts emphasized influence especially when a water-soluble catalyst is used for polymerization, resulting in unsatisfaction from an industrial viewpoint.

For overcoming the above disadvantage, for example, Japanese Pre-examination Patent Publication (KOKAI) No. 53-13689 proposes a method in which the inner wall, etc. of a polymerization vessel are coated with a polymer scale deposition preventive agent comprising a condensation product of an aromatic amine compound as an effective constituent. When such a polymer scale deposition preventive agent is applied to the areas with which monomers comes into contact, such as the inner wall surface of a polymerization vessel and so on, and a coating is thereby formed, then no polymer scale deposition takes place in the liquid-phase region in the polymerization vessel even after polymerization is repeatedly performed by about 100 to 200 batches. Besides, even in the aforementioned case where a water-soluble catalyst is used, deposition of polymer scale in the liquid-phase region is similarly prevented.

However, even after the coating of the polymer scale deposition preventive agent comprising a condensation product of the aforementioned aromatic amine compound as its effective constituent is formed, there still remains a drawback that polymer scale deposition occurs on the areas around the interface between the gas phase and the liquid phase located at an upper portion of the interior of the polymerization vessel.

Once polymer scale deposition occurs on the areas around the interface between the gas and liquid phases, the deposited polymer scale will grow gradually as polymerization runs are repeated, and at last it may peel off to be incorporated into the polymeric product. If the polymeric product is mixed with the polymer scale in such a manner, when the polymeric product is processed into formed products such as sheets or the like, many fish eyes are generated in the obtained formed products, and the quality of the formed products is seriously deteriorated.

Besides, formed products, which are obtained when the polymeric product obtained by polymerization is formed into sheets or the like, are required to have a high whiteness. That is, even when a polymeric product is formed into a sheet or the like without any addition of coloring agent, the resulting formed product may be more or less colored, and such coloration, called initial coloration, is desired to be as slight as possible. However, when the coating of the aforementioned polymer scale deposition preventive agent comprising a condensation product of the aromatic amine compound as its effective constituent is formed, the coating may peel off or dissolve to be incorporated into the polymeric product, so that whiteness of formed products may be deteriorated, that is, initial coloration may be deteriorated.

SUMMARY OF THE INVENTION

Accordingly it is an object of the present invention to provide a polymer scale deposition preventive agent for use in polymerization of a monomer having an ethylenically unsaturated double bond that can prevent effectively the deposition of polymer scale, not only on the areas in the liquid-phase region but also on the areas around the interface between the gas and liquid phases inside a polymerization vessel, and that makes it possible to produce a polymer capable of producing formed products having a very small number of fish eyes and good initial coloration when formed into sheets or the like; and a process for producing a polymer which utilizes the same.

The present invention provides, as means of achieving the above object, a polymer scale deposition preventive agent for use in polymerization of a monomer having an ethylenically unsaturated double bond, comprising an alkaline solution containing a condensation product of:

(A) a diphenyl compound having at least two amino groups represented by the following general formula (1):

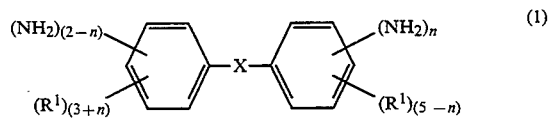

wherein a plurality of $R^1$'s may be the same or different, which are —H, —OH, —COOH, —SO$_3$H, —NH$_2$, —Cl, —NO$_2$, —COCH$_3$, —OCH$_3$, —N(CH$_3$)$_2$ or an alkyl group having 1 to 3 carbon atoms, wherein X is an alkylene group having 1 to 5 carbon atoms, —N(CH$_3$)—, —C(CH$_3$)$_2$—, —CONH—, —P(=O)H—, —SO$_2$—, —O—, —S— or —Si(R)$_2$— where R is an alkyl group having 1-10 carbon atoms, and wherein n is an integer of 1 or 2; and (B) a quinone compound.

Further, the present invention provides a process for producing a polymer by polymerization of a monomer having an ethylenically unsaturated double bond in a polymerization vessel, comprising the step of performing said polymerization in a polymerization vessel having a coating formed by drying after applying, on inner wall surfaces of the vessel, an alkaline solution containing a condensation product of:

(A) a diphenyl compound having at least two amino groups represented by the following general formula (1):

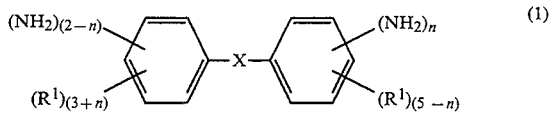

wherein a plurality of $R^1$'s may be the same or different, which are —H, —OH, —COOH, —SO$_3$H, —NH$_2$, —Cl, —NO$_2$, —COCH$_3$, —OCH$_3$, —N(CH$_3$)$_2$ or an alkyl group having 1 to 3 carbon atoms, wherein X is an alkylene group having 1 to 5 carbon atoms, —N(CH$_3$)—, —C(CH$_3$)$_2$—, —CONH—, —P(=O)H—, —SO$_2$—, —O—, —S— or —Si(R)$_2$— where R is an alkyl group having 1-10 carbon atoms, and wherein n is an integer of 1 or 2; and (B) a quinone compound; whereby polymer scale is prevented from being deposited in the polymerization vessel.

According to the present invention, deposition of polymer scale in a polymerization vessel can be effectively prevented, not only on the areas in the liquid phase region but also on the areas around the interface between the gas phase and the liquid phase.

Therefore, where polymerization is conducted by applying the present invention, the operation of removing polymer scale need not be performed every run of polymerization, and productivity is thereby improved.

In addition, the polymer obtained by polymerization with application of the present invention can be processed into formed products such as sheets or the like which have very few fish eyes.

Furthermore, the aforementioned formed products have good initial coloration. Specifically, the luminosity index (L value) in the Hunter's color difference equation described in JIS Z 8730 (1980) is, for example, 70 or more in the case of vinyl chloride polymers, and 80 or more in the case of SBR.

DETAILED DESCRIPTION OF PREFERRED EMBODIMENTS

Component (A)

The component (A) is a diphenyl compound having at least two amino groups (—NH$_2$) represented by the aforementioned general formula (1).

As the component (A) are specifically exemplified 4,4'-diaminodiphenyl sulfide, 4,4'-diaminodiphenyl ether, 4,4'-diaminodiphenylpropane, 4,4'-diaminodiphenylsulfone, bis(4-aminophenyl)diethylsilane, bis(4-aminophenyl)phosphine oxide, bis (4-aminophenyl) -N-methylamine, 4,4'-diaminobenzanilide, 4,4'-diaminodiphenylmethane and the like.

Among them, preferred are 4,4'-diaminodiphenylsulfone, 4,4'-diaminobenzanilide, 4,4'-diaminodiphenyl ether and 4,4'-diaminodiphenylmethane.

The aforementioned component (A) can be used alone as one species, or in combination of two or more species.

Component (B)

As the quinone compound (B), for example, are exemplified benzoquinone compounds represented by the following general formulae (2) and (3), and naphthoquinone compounds represented by the following general formulae (4) and (5).

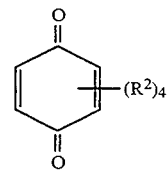

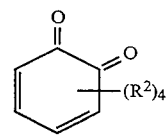

wherein in each of the formulae (2) and (3), a plurality of $R^2$'s may be the same or different, which are —H, —NH$_2$, —Cl, —Br, —OH, —NO$_2$, —COCH$_3$, —OCH$_3$, —N(CH$_3$)$_2$, —COOH, —SO$_3$H, or an alkyl group having 1 to 3 carbon atoms.

As the benzoquinone compound represented by the aforementioned general formulae (2) and (3) are specifically exemplified o- and p-benzoquinones, hydroxy-p-benzoquinone, chloro-p-benzoquinone, bromo-p-benzoquinone, duroquinone, chloranil and the like.

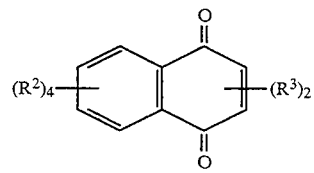

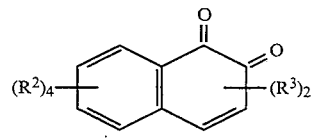

wherein in each of the formulae (4) and (5), a plurality of $R^2$'s may be the same or different, which are as described above, and wherein a plurality of $R^3$'s may be the same or different, which are —H, —Cl, —Br, —OH, —COCH$_3$, —OCH$_3$, —CH$_3$, —COOH or —SO$_3$H.

Specifically there are exemplified 6-methyl-1,4-naphthoquinone, 2-methyl-1,4-naphthoquinone, lawsone, juglone, plumbagin, α-naphthoquinone, β-naphthoquinone and the like.

Among the aforementioned quinone compounds, preferred are o- and p-benzoquinones, α-naphthoquinone, β-naphthoquinone and lawsone.

The aforementioned quinone compound (B) can be used sinlgy, or in combination of two or more.

Condensation reaction

The condensation product of the aforementioned components (A) and (B), which is the indispensable constituent of the poller scale deposition preventive agent according to the present invention, can be prepared by reacting the components (A) and (B) with each other in a suitable solvent, optionally in the presence of a catalyst as required, normally at a temperature of room temperature to 200° C. for 0.5 to 100 hours, and preferably at room temperature to 150° C. for 3 to 30 hours.

Since the component (B) acts also as a condensation catalyst, it is normally unnecessary to add another condensation catalyst. However, the condensation catalysts which may be additionally include, for example, elemental or molecular simple-substance halogens such as iodine, bromine, chlorine, fluorine and the like; oxo-acid and oxo-acid salts of halogen, such as iodic acid, periodic acid, potassium periodate, sodium perchlorate and the like; inorganic peroxides such as hydrogen peroxide, sodium peroxide, potassium persulfate, ammonium persulfate and the like; organic peroxides such as peracetic acid, benzoyl peroxide, cumen hydroperoxide, perbenzoic acid, p-menthane hydroperoxide and the like; chlorides and sulfates of a metal selected from the group consisting of iron and copper, such as ferrous chloride, ferric chloride, copper sulfate, cuprous chloride and the like; azo compounds such as $\alpha,\alpha'$-azobisisobutyronitrile, $\alpha,\alpha'$-azobis-2,4-dimethylvaleronitrile and the like; aromatic nitro compounds such as nitrobenzene, o-, m- and p-oxynitrobenzenes, o-, m- and p-nitroanisoles, o-, m- and p-chloronitrobenzenes, o-, m- and p-nitrobenzoic acids, o-, m- and p-nitrobenzenesulfonic acids and the like; and so forth.

As a solvent for the condensation reaction, for example, organic solvents such as alcohols, ketones, esters and the like can be used, among which it is preferable to use organic solvents miscible with water. As the organic solvents miscible with water include, for example, alcohols such as methanol, ethanol, propanol and the like; ketones such as acetone, methyl ethyl ketone and the like; esters such as methyl acetate, ethyl acetate and the like; aprotic solvents such as dimethylformamide, dimethyl sulfoxide, acetonitrile and the like, among which particularly preferred are alcohols. Further, mixed solvents of water and the aforementioned organic solvent miscible with water may be also used.

The medium for performing the condensation reaction normally has a pH of 1 to 13, and pH adjusters may be used without any particular restrictions.

The relative amounts of the components (A) and (B) to be brought into the condensation reaction are affected by kinds of the components (A) and (B) and solvent used, reaction temperature, reaction time and so on. Normally, it is preferable to use 0.01 to 10 parts by weight, more preferably 0.1 to 5 parts by weight of the component (B), per part by weight of the component (A). If the amount of the component (B) is too large or too small, the resulting condensation product has a lower effect in preventing polymer scale deposition. In addition, the components (A) and (B) in the solvent during the condensation reaction have a total concentration preferably in a range of 0.5 to 30% by weight, more preferably in a range of 1 to 15% by weight.

Polymer scale deposition preventive agent comprising an alkaline solution containing the condensation product of the components (A) and (B)

The polymer scale deposition preventive agent according to the present invention comprises an alkaline solution containing the condensation product of the aforementioned components (A) and (B). Such a polymer scale deposition preventive agent is applied to inner wall surfaces, etc. of a polymerization vessel, and is dried to form a coating, whereby polymer scale can be prevented from being deposited on the polymerization vessel inner wall surfaces or the like.

The polymer scale deposition preventive agent is prepared, for example, such that the solution containing the condensation product obtained by the aforementioned condensation reaction is optionally admixed with a solvent (which will be described below) as required, and the pH is controlled to the alkaline side. Alternatively, the polymer scale deposition preventive agent may be prepared such that the aforementioned condensation product-containing solution is introduced into cold water to settle the condensation product, and then the sediment thus formed is separated by filtration and dried, to which a solvent (described below) is added so as to control the pH to the alkaline side.

Because the polymer scale deposition preventive agent of the present invention is made alkaline, the solubility of the condensation product of the components (A) and (B) in the solvent is improved. Therefore, the polymer scale deposition preventive agent is provided in a uniform solution, so that when it is applied to the polymerization vessel inner wall surfaces, etc., an improved polymer scale deposition preventive effect can be obtained. Further, the polymer scale deposition preventive agent of the present invention preferably has a pH of 7.5 to 13.5, more preferably has a pH of 8.0 to 12.5. Alkaline compounds which may be used for pH adjustment include, for example, alkali metal compounds such as LiOH, NaOH, KOH, $Na_2CO_3$, $Na_2HPO_4$ and the like; ammonium compounds such as $NH_4OH$ and the like; organic amine compounds such as ethylenediamine, monoethanolamine, diethanolamine, triethanolamine, and so forth.

As the solvent for use in preparation of the polymer scale deposition preventive agent are exemplified, for example, water; alcohol solvents such as methanol, ethanol, propanol, butanol, 2-butanol, 2-methyl-1-propanol, 2-methyl-2-propanol, 3-methyl-1-butanol, 2-methyl-2-butanol, 2-pentanol and the like; ketone solvents such as acetone, methyl ethyl ketone, methyl isobutyl ketone and the like; ester solvents such as methyl formate, ethyl formate, methyl acetate, ethyl acetate, methyl acetoacetate and the like; ether solvents such as 4-methyldioxolan, ethylene glycol diethyl ether and the like; furans; aprotic solvents such as dimethylformamide, dimethyl sulfoxide, acetonitrile and the like; and so forth. These solvents may be used singly, or as a mixed solvent of two or more on a case-by-case basis.

Among the above solvents, preferred are water and mixed solvents of water and an organic solvent miscible with water. As the organic solvent miscible with water among the aforementioned organic solvents are exemplified alcohol solvents such as methanol, ethanol, propanol and the like; ketone solvents such as acetone, methyl ethyl ketone and the like; and ester solvents such as methyl acetate, ethyl acetate and the like. The mixed solvents of water and an organic solvent miscible with water preferably contain, when used, the organic solvent in such an amount that there is no fear about inflammation, explosion or the like, and safety in handling is ensured as to virulence, etc., specifically in such an amount that the organic solvent is preferably not more than 50% by weight, more preferably not more than 30% by weight.

Other ingredients

Additionally, in order to further enhance the polymer scale deposition preventive effect, it is preferable to add to the aforementioned preventive agent at least one member selected from the group consisting of (C) a water-soluble polymeric compound, (D) an inorganic colloid and (E) an alkali metal silicate.

It is expected that these additives (C) to (E) presumably have actions of interacting with the condensation product in such a manner as to improve the hydrophilicity of the surfaces being coated (in the case of the water-soluble polymeric compound (C)) or to improve adhesion of the polymer scale deposition preventive agent to the polymerization vessel inner wall (in the case of the inorganic colloid (D) and the alkali metal silicate (E)).

(C) Water-soluble polymeric compound

As the water-soluble polymeric compound (C) are exemplified ampholytic polymeric compounds such as gelatin, casein and the like; anionic polymeric compounds such as polyacrylic acid, polystyrenesulfonic acid, carboxymethyl cellulose, alginic acid and the like; cationic nitrogen-containing polymeric compounds such as polyvinyl pyrrolidone, chitosan, polyacrylamide and the like; hydroxyl group-containing polymeric compounds such as polyvinyl alcohol, hydroxyethyl cellulose, hydroxypropyl cellulose, pectin and the like; and so forth.

Among the aforementioned water-soluble polymeric is compounds, preferred are gelatin, casein, polyacrylic acid, carboxymethyl cellulose, polyvinyl pyrrolidone and pectin.

The water-soluble polymeric compounds (C) can be used singly, or in combination of two or more.

The component (C) is added in an amount of normally 1 to 1000 parts by weight, preferably 5 to 200 parts by weight, per 100 parts by weight of the condensation product of the components (A) and (B).

(D) Inorganic colloid

The inorganic colloids (D) are particulate colloids produced by a condensing method or a dispersing method using water as a dispersion medium, with the colloidal particles ranging from 1 to 500 m$\mu$ in size.

Specifically as the inorganic colloids are exemplified colloids of an oxide and hydroxide of a metal selected from the group consisting of aluminum, thorium, titanium, zirconium, antimony, tin, iron and the like; colloids of tungstic acid, vanadium pentoxide, gold and silver; silver iodide sol; colloids of selenium, sulfur, silica and the like; and so forth.

Among the inorganic colloids (D), preferred are colloids of an oxide and hydroxide of aluminum, titanium, zirconium, tin and iron; and colloidal silica.

The inorganic colloids (D) can be used alone as one species, or in combination of two or more species.

The component (C) is added in an amount of normally 1 to 1000 parts by weight, preferably 5 to 500 parts by weight, per 100 parts by weight of the aforementioned condensation product.

(E) Alkali metal silicates

As the alkali metal silicates (E) are exemplified metasilicates ($M_2SiO_3$), orthosilicates ($M_4SiO_4$), disilicates ($M_2Si_2O_3$), trisilicates ($M_3Si_3O_7$), sesquisilicates ($M_4Si_3O_{10}$) and the like of alkali metals such as lithium, sodium, potassium and the like (wherein M stands for an alkali metal such as lithium, sodium, potassium and the like); and water glass.

The alkali metal silicates (E) can be used singly or in combination of two or more.

The component (E) is contained in an amount of normally 1 to 1000 parts by weight, preferably 5 to 500 parts by weighlt, per 100 parts by weight of the aforementioned condensation product.

Incidentally, where the component (D) and the component (E) are used in combination, the total amount of the components (D) and (E) is preferably 1 to 1000 parts by weight, more preferably 5 to 500 parts by weight, per 100 parts by weight of the aforementioned condensation product.

For best improving the polymer scale deposition preventive effect, it is preferable to use a combination of the water-soluble polymeric compound (C) with the inorganic colloid (D), or a combination of the water-soluble polymeric compound (C) with the alkali metal silicate (E). Where the components (C) and (D) are used in combination, the component (D) is preferably used by 5 to 3000 parts by weight, and more preferably used by 50 to 1000 parts by weight, per 100 parts by weight of the component (C). Where the components (C) and (E) are used in combination, the component (E) is preferably used by 5 to 3000 parts by weight, and more preferably used by 50 to 1000 parts by weight, per 100 parts by weight of the component (C).

The concentration of the condensation product in the aforementioned alkaline solution is not particularly limited, as long as the total coating weight described later can be obtained, which is normally on the order of 0.001 to 5% by weight, preferably on the order of 0.01 to 1% by weight. In addition, where the components (C) to (E) are added, the total concentration of the aforementioned condensation product and the components (C) to (E) is preferably on the order of 0.05 to 5% by weight, more preferably on the order of 0.1 to 2% by weight.

Formation of coating

To form a coating on inner wall surfaces of a polymerization vessel using the polymer scale deposition preventive agent comprising the alkaline solution containing the condensation product of the components (A) and (B) prepared as described above, first the preventive agent is applied to the inner wall surfaces of the polymerization vessel, which is subsequently dried sufficiently at a temperature ranging, for example, from room temperature to 100° C., followed by washing with water as required.

Further, the aforementioned polymer scale deposition preventive agent is preferably applied to not only the inner wall surfaces of a polymerization vessel but also other areas with which the monomer comes into contact during polymerization. For example, there may be exemplified stirring blades, stirring shaft, baffles, condensers, headers, search coil, bolts, nuts, etc.

More preferably, it is recommended that the aforementioned polymer scale deposition preventive agent may be subjected to formation of the aforementioned coating even at areas with which the monomer does not come into contact during polymerization but on which polymer scale may be likely deposited, for example, the inner surfaces, etc. of equipment and pipes of an unreacted monomer recovery system. Specifically, there may be exemplified the inner surfaces of monomer distillation columns, condensers, monomer stock tanks, valves, and so on.

Incidentally, the method of applying the polymer scale deposition preventive agent to the inner wall surfaces of a polymerization vessel is not particularly restricted, for which, for example, it is possible to use brush coating, spray coating, a method by filling the polymerization vessel with the polymer scale deposition preventive agent followed by withdrawal thereof, as well as the automatic coating methods as disclosed in Japanese Pre-examination Patent Publication (KOKAI) Nos. 57-61001 and 55-36288, Japanese Patent Publication (KOHYO) Nos. 56-501116 and 56-501117, and Japanese Pre-examination Patent Publication (KOKAI) No. 59-11303, etc.

Further, the method of drying wet coated surfaces provided by application of the polymer scale deposition preventive agent, is not restricted, either. For example, the following methods can be used. Namely, there can be used a method in which, after the polymer scale deposition preventive agent is applied, hot air with a suitable elevated temperature is blown to the coated surface; a method in which the inner wall surfaces of a polymerization vessel and the surfaces of other parts to be coated with the polymer scale deposition preventive agent are preliminarily heated, for example, to a temperature of 30° to 80° C., and the polymer scale deposition preventive agent is directly applied to the heated surfaces; and so on. After coated surfaces are dried, the coated surfaces are washed with water, if necessary.

The coating obtained in this manner has a total coating weight after dried of normally 0.001 to 5 g/m$^2$, preferably 0.05 to 2 g/m$^2$.

The aforementioned coating operation may be performed every one to ten and several batches of polymerization. The formed coating has good durability and retains the polymer scale deposition-preventing action; therefore, the coating operation may not necessarily be carried out every one batch of polymerization. Accordingly, productivity is improved.

Polymerization

After the formation of the coating by applying the coating operation onto the inner wall surfaces of a polymerization vessel, and preferably also onto other areas with which monomer may come into contact during polymerization, etc. as described above, polymerization is carried out in the polymerization vessel in accordance with conventional procedures. That is, a monomer having an ethylenically unsaturated double bond and a polymerization initiator (catalyst) as well as optionally a polymerization medium such as water, etc., a dispersing agent such as suspending agents, solid dispersing agents, nonionic or anionic emulsifying agents, etc., and the like are charged, and then polymerization is carried out according to conventional procedures.

As the monomers having an ethylenically unsaturated double bond which can be polymerized by applying the process of the present invention are exemplified vinyl halides such as vinyl chloride and the like; vinyl esters such as vinyl acetates, vinyl propionates and the like; acrylic acid, methacrylic acid, and their esters and salts; maleic acid, fumaric acid, and their esters and anhydrides; diene monomers such as butadiene, chloroprene, isoprene and the like; styrene; acrylonitrile; vinylidene halides; vinyl ethers; and so forth. They may be used alone as one species, or in combination of two or more species.

Further, the process according to the present invention to be applied has no particular restriction on the type of polymerization, which is effective in any of such polymerization types as suspension polymerization, emulsion polymerization, solution polymerization, bulk polymerization, and gas phase polymerization, and is more suited to polymerization in an aqueous medium, such as suspension polymerization, emulsion polymerization and so forth.

In the following, taking the cases of suspension polymerization and emulsion polymerization as an example, general procedures of polymerization will be specifically described.

First, water and a dispersing agent are charged into a polymerization vessel. Subsequently, the polymerization vessel is evacuated to reduce the internal pressure to 0.1 to 760 mmHg, and a monomer is then charged. At this time, the internal pressure of the polymerization vessel is usually 0.5 to 30 kgf/cm$^2$·G. In addition, a polymerization initiator is charged before charging and/or after charging the monomer. Subsequently, polymerization is carried out at a reaction temperature of 30° to 150° C. During the polymerization, one or more species of water, a dispersing agent and a polymerization initiator may be added, if necessary. Further, reaction temperature during the polymerization is different depending on the kind of monomer to be polymerized. For example, in the case of polymerizing vinyl chloride, polymerization is carried out at 30° to 80° C., while in the case of polymerizing styrene, polymerization is carried out at 50° to 150° C. The polymerization may be judged to be completed when the pressure inside the polymerization vessel has fallen to 0 to 7 kgf/cm$^2$·G, or when cooling water which is let flow into and out of a jacket provided around the outer circumference of the polymerization vessel has come to show substantially no difference in temperature at an inlet and an outlet (i.e., when liberation of heat due to polymerization reaction has disappeared). The amounts of water, dispersing agent and polymerization initiator to be charged for polymerization are normally 20 to 500 parts by weight of water, 0.01 to 30 parts by weight of the dispersing agent, and 0.01 to 5 parts by weight of the polymerization initiator, per 100 parts by weight of the monomer.

In solution polymerization, an organic solvent such as toluene, xylene, pyridine, etc. is used as the polymerization medium, in place of water. A dispersing agent may be used, if necessary. The other conditions for polymerization are generally the same as those described for suspension polymerization and emulsion polymerization.

In bulk polymerization, after a polymerization vessel is evacuated to a pressure of about 0.01 to 760 mmHg, a monomer and a polymerization initiator are charged into the polymerization vessel, and polymerization is carried out at a reaction temperature of −10° to 250° C. For example, polymerization of vinyl chloride is carried out at 30° to 80° C., while polymerization of styrene is carried out at 50° to 150° C.

Where polymerization is carried out by applying the process of the present invention, it is possible to prevent polymer scale from being deposited, regardless of the materials of the inner wall surfaces, etc. of a polymerization vessel. For example, the polymer scale deposition can be prevented from occurring during polymerization in a polymerization vessel treated with glass-lining or the like as a matter of course, as well as a polymerization vessel made of stainless steel or other steel and so forth.

Further, those added to polymerization systems can be used without any limitation. That is to say, the process of the present invention can effectively prevent polymer scale deposition in polymerization systems including, for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g. hydroxypropyl methyl cellulose), gelatin, etc.; solid dispersing agents such as calcium phosphate, hydroxyapatite, etc.; nonionic emulsifying agents such as sorbitan monolaurate, sorbitan trioleate, polyoxyethylene alkyl ether, etc.; anionic emulsifying agents such as sodium lauryl sulfate, sodium alkylbenzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; plasticizers such as DOP, DBP, etc.; chain transfer agents such as mercaptans (e.g. t-dodecyl mercaptan), trichloroethylene, etc.; pH adjusters, and so forth.

Incidentally, in addition to being used for formation of the coating on the inner wall surfaces etc. of the polymerization vessel, the polymer scale deposition preventive agent of the present invention may further be added directly to the polymerization system, whereby it is also possible to enhance the effect in preventing deposition of polymer scale. In that case, the addition amount of the polymer scale deposition preventive agent suitably ranges from about 10 to about 1000 ppm based on the total weight of the monomer or monomers to be charged. At the time of the addition, care should be taken not to affect adversely the fish eye, bulk specific gravity, particle size distribution or other qualities of the resulting polymeric product.

EXAMPLES

The present invention will now be described in detail below, with reference to working examples thereof and comparative examples. Incidentally, in each of the tables below, the experiments bearing a No. marked with * are comparative examples, and the other experiments, bearing a non-marked No., are working examples of the present invention.

Preparation Example 1

Preparation of condensation product No. 1

A reaction vessel having an internal capacity of 2 liters equipped with a reflux condenser was charged with 800 g of methanol, 100 g of dimethylformamide (DMF) and 40 g of 4,4'-diaminodiphenylsulfone as component (A), followed by stirring at room temperature to dissolve 4,4'-diaminodiphenylsulfone in methanol/DMF.

To the methanol/DMF solution thus obtained was added 60 g of α-naphthoquinone as component (B) to raise the temperature to 65° C. to perform reaction at 65° C. for 24 hours. Subsequently, an obtained reaction mixture was cooled, and added dropwise to water, and a deposited sediment was separated by filtration and dried. Thus a condensation product No. 1 was obtained. Preparation of condensation products Nos. 2 to 7

In each preparation, a condensation product was prepared in the same manner as in the preparation of the condensation product No. 1 except for using the component (A) (diphenyl compound having at least two amino groups) and the component (B) (quinone compound) shown in Table 1, and the solvent shown in Table 2.

Total concentration of (A)+(B), weight ratio of (A):(B), reaction temperature and reaction time are set forth in Table 2.

TABLE 1

| Condensation product No. | (A) Diphenyl compound having at least two amino groups | (B) Quinone compound |
|---|---|---|
| 1 | 4,4'-Diaminodiphenylsulfone | α-Naphthoquinone |
| 2* | 4,4'-Diaminodiphenylsulfone | — |
| 3* | — | α-Naphthoquinone |
| 4 | 4,4'-Diaminobenzanilide | α-Naphthoquinone |
| 5 | 4,4'-Diaminodiphenyl ether | p-Benzoquinone |
| 6 | 4,4'-Diaminodiphenylmethane | p-Benzoquinone |
| 7 | 4,4'-Diaminodiphenyl sulfide | p-Benzoquinone |

TABLE 2

| Condensation product No. | Total conc. of (A) + (B) (%) | (A):(B) (wt. ratio) | Solvent (wt. ratio) | Reaction temperature (°C.) | Reaction time (hour) |
|---|---|---|---|---|---|
| 1 | 10 | 1:1.5 | Methanol/DMF (8:1) | 65 | 24 |
| 2* | 10 | — | Methanol/DMF (8:1) | 65 | 24 |
| 3* | 10 | — | Methanol/DMF (8:1) | 65 | 24 |
| 4 | 10 | 1:2 | Methanol | 65 | 24 |
| 5 | 10 | 1:1.5 | Methanol/DMSO (8:2) | 65 | 24 |
| 6 | 10 | 1:0.5 | Methanol/Acetonitrile (8:2) | 65 | 48 |
| 7 | 5 | 1:1 | Methanol/DMF (8:2) | 65 | 24 |

DMF: Dimethylformamide
DMSO: Dimethyl sulfoxide

Example 1 (Experiment Nos. 101 to 108)

In each experiment, a stainless-steel polymerization vessel having an internal capacity of 1000 liters and equipped with a stirrer was used as the polymerization vessel.

In each experiment, a polymer scale deposition preventive agent was prepared by using the condensation product (F), water-soluble polymeric compound (C), inorganic colloid (D) and alkali metal silicate (E) set forth in Table 3, and alkaline compound and solvent set forth in Table 4 so as to provide conditions (solvent composition, total concentration of condensation product (F)+(C)+(D)+(E), weight ratio of (F):(C):(D):(E), and pH) shown in Table 4. Incidentally, the inorganic colloids as the component (D) (a to g, in Table 3 and Table 7) used in this example and Example 2 described below are shown in Table 6.

In each experiment, the polymer scale deposition preventive agent prepared as above was applied to the inner wall of the polymerization vessel and to the stirring shaft, stirring blades and the like parts with which the monomer might come into contact during polymerization, to perform heating and drying at 40° C. for 15 minutes to form a coating, followed by washing the inside of the polymerization vessel with water.

Subsequently, in each experiment, polymerization was conducted as follows. The polymerization vessel provided with the coating by the coating treatment as above was charged with 400 kg of water, 200 kg of vinyl chloride, 250 g of partially saponified polyvinyl alcohol, 25 g of hydroxypropyl methyl cellulose and 70 g of 3,5,5-trimethylhexanoyl peroxide, followed by polymerization with stirring at 66° C. for 6 hours. After the polymerization was finished, the polymeric product and unreacted monomer were recovered, and the inside of the polymerization vessel was washed with water to remove residual resin.

Thereafter, the above process including the polymerization and the washing of the inside of polymerization vessel with water was regarded as one batch, and the same process was repeated by the repetition number of batches being given in Table 5, without carrying out the coating operation.

For each experiment, after the final batch was over, the amount of polymer scale deposited on areas located in the liquid-phase region and that on areas around the interface between gas and liquid phases inside the polymerization vessel were determined according to the method described below. The results are given in Table 5.

Measurement of the amount of polymer scale deposited

The scale deposited in an area of 10 cm square at a predetermined location on the inner wall of a polymerization vessel was scraped off with a stainless steel spatula as completely as can be confirmed with the naked eye, and then weighed on a balance. The measured value was multiplied by 100 to obtain the amount of the deposited polymer scale per area of 1 m².

Besides, the number of fish eyes appearing upon formation of a polymer obtained in each experiment into a sheet was measured according to the method below. The results are given in Table 5.

Measurement of fish eyes

A mixture, which was prepared in a blending ratio of 100 parts by weight of a polymer obtained, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black, was kneaded at 150° C. for 7 minutes with 6 inch rolls, and then formed into a sheet 0.2 mm thick. The obtained sheet was examined for the number of fish eyes contained per 100 cm² by means of the light transmission method.

Further, in order to evaluate initial coloration in the case of formation of the polymer obtained in each experiment into a sheet, measurement of luminosity index (L value) was carried out according to the method below. The results are given in Table 5.

Measurement of luminosity index (L value)

A hundred (100) parts by weight of the obtained polymer, 1 part by weight of a tin laurate stabilizing agent (TS-101, product of Akishima Chemical Co.), 0.5 part by weight of cadmium stabilizing agent (C-100J, product of Katsuta Kako Co.), and 50 parts by weight of dioctyl phthalate as a plasticizer were kneaded at 160° C. for 5 minutes with a twin roll mill, and then formed into a sheet 1 mm thick. Subsequently, the formed sheet was placed in a mold measuring 4×4×1.5 cm, heated at 160° C. under a pressure of 65 to 70 kgf/cm² for 0.2 hour, and press molded to prepare a test specimen. This test specimen was measured for luminosity index L in the Hunter's color difference equation described in JIS Z 8730 (1980). The greater the value of L, the higher the whiteness evaluated, namely, the better the initial coloration evaluated.

The value of L was determined as follows.

The stimulus value Y of XYZ color system was determined by the photoelectric tristimulus colorimetry using the standard light C and photoelectric colorimeter (Color measuring color difference meter Model Z-1001 DP, product of Nippon Denshoku Kogyo K.K.) in accordance with description of JIS Z 8722. As the geometric condition of illumination and light reception, the condition d defined in section 4.3.1 of JIS Z 8722 was adopted. From the stimulus value Y obtained, the L value was calculated based on the equation: $L = 10Y^{\frac{1}{2}}$ described in JIS Z 8730 (1980).

TABLE 3

| Exp. No. | (F) Condensation product No. | (C) Water-soluble polymeric compound | (D) Inorganic colloid | (E) Alkali metal silicate |
|---|---|---|---|---|
| 101 | 1 | Gelatin | b | — |
| 102* | 2* | Gelatin | b | — |
| 103* | 3* | Gelatin | b | — |
| 104 | 4 | Polyacrylic acid | c | — |
| 105 | 5 | Polyvinyl alcohol | a | — |
| 106 | 6 | — | — | — |
| 107* | 7 | Polyvinyl pyrrolidone | d | — |
| 108 | 7 | Polyvinyl pyrrolidone | — | water glass |

TABLE 4

| Exp. No. | Total conc. of (F) + (C) + (D) + (E) (wt. %) | (F):(C):(D):(E) (weight ratio) | Alkaline compound (pH) | Solvent (weight ratio) |
|---|---|---|---|---|
| 101 | 0.5 | 100:100:100:0 | NaOH (11.0) | Water:Methanol (70:30) |
| 102* | 0.5 | 100:100:100:0 | NaOH (11.0) | Water:Methanol (70:30) |
| 103* | 0.5 | 100:100:100:0 | NaOH (11.0) | Water:Methanol (70:30) |
| 104 | 0.5 | 100:50:100:0 | NaOH (11.0) | Water:Methanol (90:10) |
| 105 | 0.5 | 100:50:200:0 | KOH (11.0) | Water:Methanol (90:10) |
| 106 | 0.3 | — | Ethylenediamine (11.0) | Water:Methanol (90:10) |
| 107* | 0.3 | 100:100:200:0 | — | Water:Methanol (90:10) |
| 108 | 0.3 | 100:100:0:300 | NaOH (12.0) | Water:Methanol (90:10) |

TABLE 5

| Exp. No. | Repetition number of batch | Scale deposition amount (g/m$^2$) Liquid phase | Scale deposition amount (g/m$^2$) Gas phase-liquid phase interface | Number of fish eyes | Luminosity index (L) |
| --- | --- | --- | --- | --- | --- |
| 101 | 4 | 0 | 3 | 9 | 73.0 |
| 102* | 2 | 20 | 90 | 24 | 73.0 |
| 103* | 2 | 20 | 93 | 28 | 73.0 |
| 104 | 5 | 0 | 4 | 8 | 73.0 |
| 105 | 4 | 0 | 3 | 8 | 73.0 |
| 106 | 3 | 0 | 12 | 16 | 73.0 |
| 107* | 2 | 18 | 88 | 25 | 73.0 |
| 108 | 4 | 0 | 4 | 8 | 73.0 |

TABLE 6

| Inorganic colloid | Diameter of colloidal particles | Name of article | Manufacturer |
| --- | --- | --- | --- |
| a | 10–20 mμ | Snowtex O* (colloidal silica) | Nissan Chemical Industries. Ltd. |
| b | 5–7 mμ | Snowtex CXS-9* (colloidal silica) | Nissan Chemical Industries. Ltd. |
| c | 100–200 mμ | Titanium oxide | Nissan Chemical Industries. Ltd. |
| d | 10–20 mμ | Aluminum oxide | Nissan Chemical Industries. Ltd. |
| e | 60–70 mμ | Zirconium oxide | Nissan Chemical Industries. Ltd. |
| f | 20–50 mμ | Tin oxide | Nissan Chemical Industries. Ltd. |
| g | 10–15 mμ | Iron hydroxide | produced by the present inventors |

Note
*Trade name

In each experiment, a stainless-steel polymerization vessel having an internal capacity of 20 liters and equipped with a stirrer was used as the polymerization vessel.

In each experiment, a polymer scale deposition preventive agent was prepared by using the condensation product (F), water-soluble polymeric compound (C), inorganic colloid (D) and alkali metal silicate (m) set forth in Table 7, and alkaline compound and solvent set forth in Table 8 so as to provide conditions (solvent composition, total concentration of condensation product (F)+(C)+(D)+(E), weight ratio of (F):(C):(D):(E), and pH) shown in Table 8. Each of these polymer scale deposition preventive agents was applied to the inner wall of the polymerization vessel and to the stirring shaft, stirring blades and the like parts with which the monomer might come into contact during polymerization, to perform heating and drying at 40° C. for 15 minutes to form a coating, followed by washing the inside of the polymerization vessel with water.

Subsequently, in each experiment, polymerization was conducted as follows. The polymerization vessel provided with the coating by the coating treatment as above was charged with 9 kg of water, 225 g of sodium dodecylbenzenesulfonate, 12 g of t-dodecyl mercaptan and 13 g of potassium peroxodisulfate. The inside atmosphere of the polymerization vessel was replaced with nitrogen gas, thereafter 1.3 kg of styrene and 3.8 kg of butadiene were charged to carry out polymerization at 50° C. for 20 hours. After the polymerization was finished, the polymeric product and unreacted monomer were recovered, and the inside of the polymerization vessel was washed with water to remove residual resin.

Thereafter, the above process including the polymerization and the washing of the inside of polymerization vessel with water was regarded as one batch, and the same process was repeated by the repetition number of batches being given in Table 9, without carrying out the coating operation.

For each experiment, after the final batch was over, the amount of polymer scale deposited on areas located in the liquid-phase region and that on areas around the interface between gas and liquid phases inside the polymerization vessel were determined according to the same method as in Example 1. The results are given in Table 9.

In addition, in order to evaluate initial coloration in the case of formation of the polymer obtained in each experiment into a sheet, measurement of luminosity index (L value) was carried out according to the method below. The results are given in Table 9.

Measurement of luminosity index (L value)

To 1 kg of the polymer latex obtained was added 1 kg of 2% magnesium sulfate solution to cause aggregation and sedimentation, and thereafter the sediment was filtered off. The filtered sediment was washed with hot water at 80° to 90° C. twice or three times, and then dried at 40° C. for 25 hours in a vacuum dryer to obtain a resin.

The obtained resin was placed in a mold measuring 9×9×0.1 cm (depth), heated at 195° C. under a pressure of 50 to 60 kgf/cm$^2$ for 0.2 hour, and press molded under a final pressure of 80 kgf/cm$^2$ to prepare a test specimen. This test specimen was measured for luminosity index L in the same manner as in Example 1.

TABLE 7

| Exp. No. | (F) Condensation product No. | (C) Water-soluble polymeric compound | (D) Inorganic colloid | (E) Alkali metal silicate |
| --- | --- | --- | --- | --- |
| 201 | 1 | Polyacrylic acid | b | — |
| 202* | 2* | Polyacrylic acid | b | — |
| 203* | 3* | Polyacrylic acid | b | — |
| 204 | 4 | Sodium alginate | e | — |
| 205 | 5 | Polyvinyl pyrrolidone | f | — |
| 206 | 6 | — | — | — |
| 207 | 7 | Gelatin | g | — |

TABLE 8

| Exp. No. | Total conc. of (F) + (C) + (D) + (E) (wt. %) | (F):(C):(D):(E) (weight ratio) | Alkaline compound (pH) | Solvent (weight ratio) |
| --- | --- | --- | --- | --- |
| 201 | 0.5 | 100:100:100:0 | NaOH (11.5) | Water:Methanol (70:30) |
| 202* | 0.5 | 100:100:100:0 | NaOH (11.5) | Water:Methanol (70:30) |
| 203* | 0.5 | 100:100:100:0 | NaOH (11.5) | Water:Methanol (70:30) |
| 204 | 0.5 | 100:100:200:0 | NaOH (11.5) | Water:Methanol (70:30) |
| 205 | 0.5 | 100:100:300:0 | NaOH (11.5) | Water:Methanol (70:30) |
| 206 | 0.5 | — | Ethylenediamine (11.0) | Water:Methanol (70:30) |

TABLE 8-continued

| Exp. No. | Total conc. of (F) + (C) + (D) + (E) (wt. %) | (F):(C):(D):(E) (weight ratio) | Alkaline compound (pH) | Solvent (weight ratio) |
|---|---|---|---|---|
| 207 | 0.5 | 100:50:100:0 | Ethylene-diamine (11.0) | Water:Methanol (70:30) |

TABLE 9

| Exp. No. | Repetition number of batch | Results of polymerization | | Luminosity index (L) |
|---|---|---|---|---|
| | | Scale deposition amount (g/m²) | | |
| | | Liquid phase | Gas phase-liquid phase interface | |
| 201 | 2 | 0 | 3 | 85.0 |
| 202* | 1 | 16 | 155 | 85.0 |
| 203* | 1 | 21 | 165 | 85.0 |
| 204 | 2 | 0 | 2 | 85.0 |
| 205 | 2 | 0 | 1 | 85.0 |
| 206 | 1 | 0 | 2 | 85.0 |
| 207 | 2 | 0 | 2 | 85.0 |

Example 3

A stainless-steel polymerization vessel having an internal capacity of 20 liters and equipped with a stirrer was used as the polymerization vessel.

The polymer scale deposition preventive agent used in the experiment No. 201 of Example 2 was applied to the inner wall of the polymerization vessel and to the stirring shaft, stirring blades and the like parts with which the monomer might come into contact during polymerization, to perform heating and drying at 50° C. for 15 minutes to form a coating, followed by washing with water.

Thereafter, the polymerization vessel provided with the coating by the coating treatment as above was charged with 4.0 kg of water and 6 g of sodium dodecylbenzenesulfonate, and temperature was raised to 60° C. with stirring. Subsequently after the gas phase in the polymerization vessel was replaced with nitrogen gas, 94 g of n-butyl acrylate, 220 g of methyl methacrylate, 5 g of acrylic acid and 5 g of methacrylic acid were charged, and subsequently 1 g of ammonium persulfate and 1 g of sodium hydrosulfite were charged to perform stirring at 60° C. for 20 minutes.

Furthermore, into the aforementioned polymerization vessel were added a monomeric mixture (prepared by mixing 2.1 kg of n-butyl acrylate, 4.8 kg of methyl methacrylate, 100 g of acrylic acid and 100 g of methacrylic acid), 500 g of an aqueous 1 wt. % ammonium persulfate solution, 500 g of an aqueous 1 wt. % sodium hydrosulfite solution and 2.0 kg of an aqueous 25 wt. % polyoxyethylene nonyl phenyl ether solution respectively evenly over a 3-hour period. After the addition was completed, the aforementioned polymerization vessel was subjected to temperature raising to 70° C. to perform polymerization for 2 hours.

After the polymerization was over, the resulting polymeric product and unreacted monomers were recovered, and the inside of the polymerization vessel was washed with water to remove residual resin.

Thereafter, the operation from the formation of the coating through polymerization to the washing of the inside of the polymerization vessel with water as described above was regarded as one batch, which was repeated 80 batches, and the amount of polymer scale deposited on areas localted in the liquid-phase region and that on areas around the interface between gas and liquid phases inside the polymerization vessel upon the 80th batch were measured in the same manner as in Example 1. As a result, the amount of polymer scale deposited on areas located in the liquid-phase region was 0 g/m², and the amount of polymer scale deposited on areas around the interface between gas and liquid phases was 20 g/m².

We claim:

1. A polymer scale deposition preventive agent for use in polymerization of a monomer having an ethylenically unsaturated double bond, comprising an alkaline solution having as a solvent thereof water or a mixed solvent of water and an organic solvent miscible with water, the amount of water contained in the mixed solvent being more than 70% by weight, and said alkaline solution having a pH of 7.5 to 13.5 which has been adjusted by the addition of an alkaline compound, and containing a condensation product of:

(A) a diphenyl compound having at least two amino groups represented by the following general formula (1):

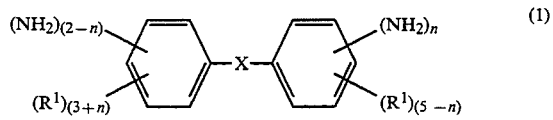

wherein a plurality of $R^1$'s may be the same or different, which are —H, —OH, —COOH, -SO₃H, —NH₂, —Cl, —NO₂, —COCH₃, —OCH₃, —N(CH₃)₂ or an alkyl group having 1 to 3 carbon atoms, wherein X is an alkylene group having 1 to 5 carbon atoms, —N(CH₃)—, —C(CH₃)₂—, —CONH—, —P(=O)H—, —SO₂—, —O—, —S—, or —Si(R)₂—, where R is an alkyl group having 1–10 carbon atoms, and wherein n is an integer of 1 or 2; and (B) a quinone compound.

2. The polymer scale deposition preventive agent according to claim 1, wherein said component (A) contains at least one compound selected from the group consisting of 4,4'-diaminodiphenylsulfone, 4,4'-diaminobenzanilide, 4,4'-diaminodiphenyl ether and 4,4'-diaminodiphenylmethane.

3. The polymer scale deposition preventive agent according to claim 1, wherein said component (B) comprises a compound selected from the group consisting of the compounds represented by the following general formulae (2) to (5):

a compound represented by:

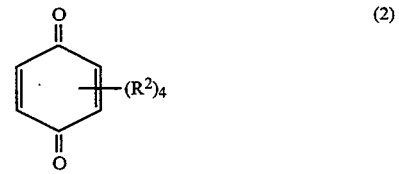

wherein a plurality of R²'s may be the same or different, which are —H, —NH₂, —Cl, —Br, —OH, —NO₂, —COCH₃, —OCH₃, —N(CH₃)₂, —COOH, —SO₃H, or an alkyl group having 1 to 3 carbon atoms;

a compound represented by:

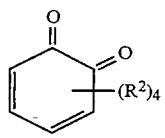

wherein a plurality of R²'s may be the same or different, which are as defined above;
a compound represented by:

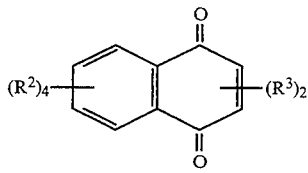

wherein a plurality of R²'s may be the same or different, which are as defined above, and wherein a plurality of R³'s may be the same or different, which are —H, —Cl, —Br, —OH, —COCH₃, —OCH₃, —CH₃, —COOH or —SO₃H; and
a compound represented by:

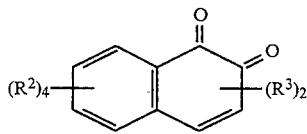

wherein a plurality of R²'s may be the same or different, which are as defined above, and wherein a plurality of R³'s may be the same or different, which are as defined above.

4. The polymer scale deposition preventive agent according to claim 1, wherein said component (B) comprises at least one compound selected from the group consisting of o- and p-benzoquinones, α-naphthoquinone, β-naphthoquinone and lawsone.

5. The polymer scale deposition preventive agent according to claim 1, wherein said condensation product has been produced by condensation of 0.01 to 10 parts by weight of the component (B) with 1 part by weight of the component (A).

6. The polymer scale deposition preventive agent according to claim 1, further comprising at least one member selected from the group consisting of:
   (C) a water-soluble polymeric compound;
   (D) an inorganic colloid; and
   (E) an alkali metal silicate.

7. The polymer scale deposition preventive agent, according to claim 1, wherein said alkaline compound is selected from the group consisting of LiOH, NaOH, KOH, Na₂CO₃, Na₂HPO₄, NH₄OH, ethylenediamine, monoethanolamine, diethanolamine and triethanolamine.

8. The polymer scale deposition preventive agent according to claim 1, wherein the alkaline solution has a pH of 8.0 to 12.5.

9. The polymer scale deposition preventive agent according to claim 1, wherein the condensation product has been produced by reacting the components (A) and (B) at room temperature to 150° C. for 3 to 30 hours.

* * * * *